UNITED STATES PATENT OFFICE.

BENNO HOMOLKA, OF FRANKFORT-ON-THE-MAIN, GERMANY, ASSIGNOR TO THE FARBWERKE, VORMALS MEISTER, LUCIUS & BRÜNING, OF HÖCHST-ON-THE-MAIN, GERMANY.

PROCESS OF MANUFACTURING AROMATIC ALDEHYDES.

SPECIFICATION forming part of Letters Patent No. 575,237, dated January 12, 1897.

Application filed June 4, 1896. Serial No. 594,193. (No specimens.)

*To all whom it may concern:*

Be it known that I, BENNO HOMOLKA, doctor of philosophy, a citizen of the Empire of Austria-Hungary, residing at Frankfort-on-the-Main, in the Empire of Germany, have invented certain new and useful Improvements in Processes of Manufacturing Aromatic Aldehydes, of which the following is a specification.

I have discovered that the benzyl compounds of anilin and its homologues of the general formula $$R_1NH-CH_2=R_{11}$$

are transformed by an appropriate oxidation, with the loss of two atoms of hydrogen, into the corresponding benzal (benzyliden) compounds of the general formula $$R_1N=CHR_1,$$

which are decomposed by means of inorganic acids into bases and aldehyde, according to the following equation:

$$R_1N=CHR_{11}+H_2O=R_1NH_2+R_{11}COH.$$

I obtain, for instance, benzaldehyde by warming benzylanilin or its homologues with an acidulated bichromate solution. If benzylanilin is replaced by orthonitrobenzylanilin, described by Sellman & Stickel, (*Berichte der Deutschen Chemischen Gesellschaft*, Vol. 19, 1605,) or by the paranitrobenzylanilin of Strackosch, (*Berichte der Deutschen Chemischen Gesellschaft*, Vol. 6, 1062,) I obtain by the same method in the first case orthonitrobenzylaldehyde, and in the second case paranitrobenzylaldehyde, both in a condition of greatest purity.

As an example, I proceed in the following manner:

1. *Manufacture of benzaldehyde.*—A large retort, provided with an agitator and cooler, is filled with one hundred kilograms benzylanilin, five hundred to one thousand liters of water. After the agitator is set to work the contents of the vessel are raised to the boiling-point by allowing steam to pass through them, after which, by means of a suitably-shaped funnel, a solution, consisting of fifty kilograms bichromate in two hundred liters of water, acidulated with one hundred and sixty-five kilograms of hydrochloric acid (21° Baumé) or its equivalent of sulfuric acid, is slowly run in in the course of a few hours. Soon after, a mixture of water and benzaldehyde is distilled off. The aldehyde is separated and, if necessary, purified, in the usual manner and brought into a serviceable form. The benzylanilin may be replaced in this example by the equivalent quantities of benzylorthotoluidin or benzylparatoluidin or by a mixture of the above-mentioned benzyl bases.

The reaction is expressed by the following equations:

$$C_6H_5NH-CH_2-C_6H_5-H_2=C_6H_5N=CHC_6H_5.$$
$$C_6H_5NH=CHC_6H_5+H_2O=C_6H_5NH_2+HOCC_6H_5.$$

By employing benzyltoluidin, (ortho or para:)

$$C_7H_7NH-CH_2-C_6H_5-H_2=C_7H_7N=CHC_6H_5.$$
$$C_7H_7NH=CHC_6H_5+H_2O=C_7H_7NH_2+HOCC_6H_5.$$

2. *Manufacture of orthonitrobenzaldehyde.*—When in the previous example the benzylanilin is replaced by one hundred and twenty kilograms of orthonitrobenzylanilin or by the equivalent quantity of orthonitrobenzyltoluidin, I obtain, by retaining the above-mentioned apparatus and mode of procedure, a distillate from which on cooling the orthonitrobenzaldehyde crystallizes in the well-known colorless needles of a centimeter in length. The distillation is continued as long as a cooled sample of the distillate shows, on addition of aceton and soda-lye, the known indigo reaction. When in this example the orthonitrobenzylanilin is replaced by paranitrobenzylanilin or paranitrobenzylortho or paratoluidin I obtain paranitrobenzaldehyde.

The reactions of the second example are expressed by the following equations.

By employing nitrobenzylanilin:

$$C_6H_5NH-CH_2-C_6H_4-NO_2-H_2=C_6H_5N=CHC_6H_4NO_2.$$
$$C_6H_5N=CHC_6H_4NO_2+H_2O=C_6H_5NH_2+HOCC_6H_4NO_2.$$

By employing nitrobenzyltoluidin:

$$C_7H_7NH-CH_2C_6H_4NO_2-H_2=C_7H_7N:CHC_6H_4NO_2.$$
$$C_7H_7N:CHC_6H_4NO_2+H_2O=C_7H_7NH_2+HOC.C_6H_4NO_2.$$

In all the above-mentioned examples the bichromate may be replaced by the equivalent quantity of other oxidizing agents—for instance, by ferric salts or oxidizing manganese and lead compounds.

Having thus described my invention, I claim as new and desire to secure by Letters Patent—

The process herein described of manufacturing aromatic aldehydes, which consists in subjecting monobenzylanilin its homologues or nitro products to oxidation in the presence of dilute mineral acids, substantially as set forth.

In testimony that I claim the foregoing as my invention I have signed my name in presence of two subscribing witnesses.

BENNO HOMOLKA.

Witnesses:
HEINRICH HAHN,
ALFRED BRISBOIS.